Patented May 16, 1933

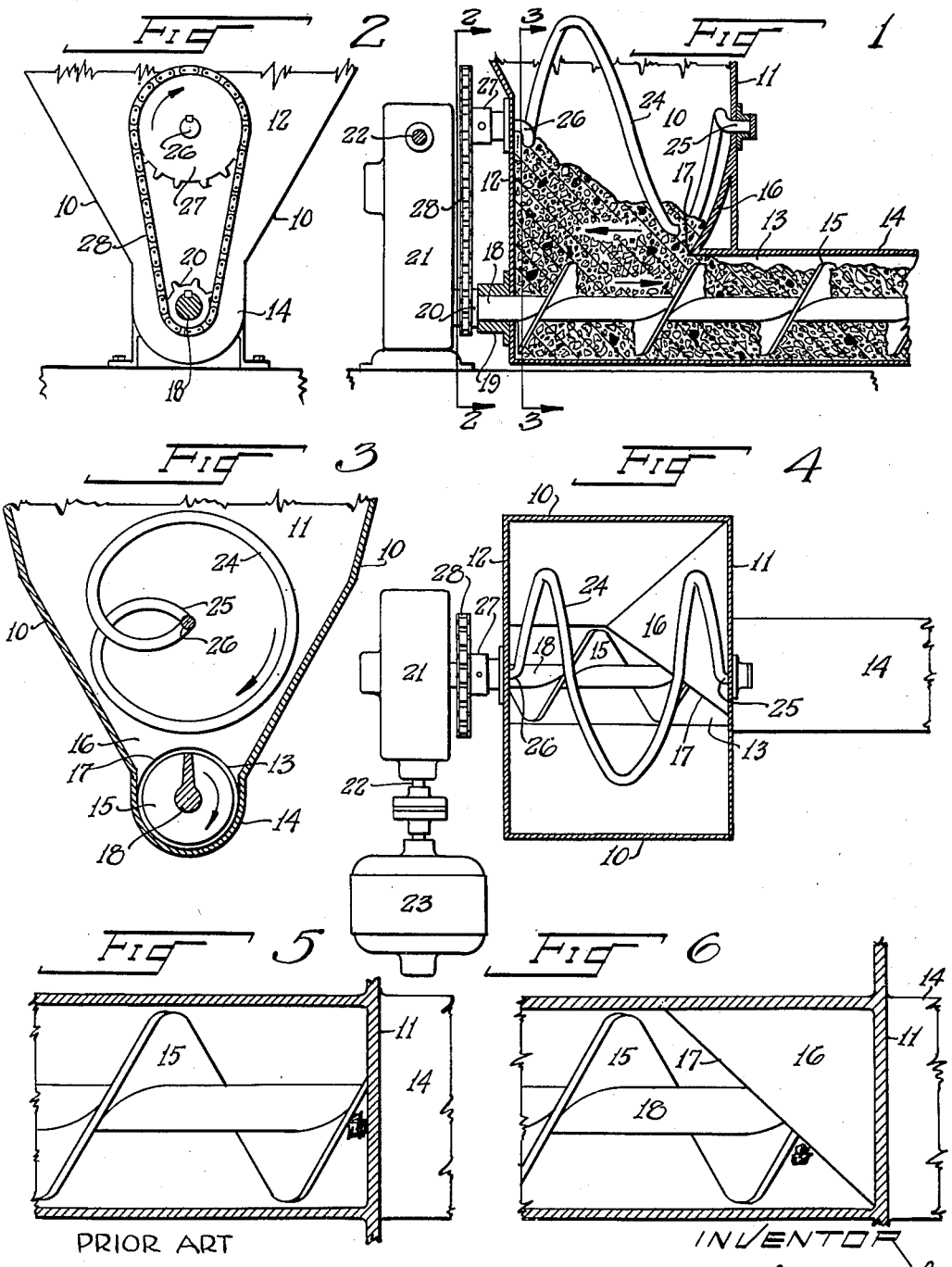

1,908,882

UNITED STATES PATENT OFFICE

EDWARD B. BIRKENBEUEL, OF PORTLAND, OREGON, ASSIGNOR TO IRON FIREMAN MANUFACTURING COMPANY, OF PORTLAND, OREGON

HOPPER FOR STOKERS

Application filed November 4, 1929. Serial No. 404,565.

This invention relates generally to coal stokers, and particularly to stokers of the type from which fuel is fed by means of a screw conveyor.

The main object of this invention is to provide a special form of hopper for stokers having screw conveyors which will reduce the amount of noise occasioned by coal shearing at the outlet of the hopper.

The second object is to provide an agitator for the hopper which will break up any congestion occurring around the outlet of the hopper, and which will move the fuel within the hopper in the direction opposite in which it is being moved by the conveying screw—that is, piling it away from the outlet opening.

The third object is to produce a hopper for stokers having an agitator whose drive mechanism is outside of the hopper.

These, and other objects, will become more apparent from the specification following as illustrated in the accompanying drawing, in which:

Figure 1 is a fragmentary longitudinal section through the hopper and fuel duct.

Figure 2 is a vertical section along the line 2—2 in Figure 1.

Figure 3 is a vertical section along the line 3—3 in Figure 1.

Figure 4 is a plan of the hopper showing the operating motor and gearing.

Figure 5 is a fragmentary plan of the usual form of hopper showing the square outlet thereof.

Figure 6 is a similar view of the improved form of hopper having an angling outlet.

Similar numbers of reference refer to similar parts throughout the several views.

Referring in detail to the drawing, there is shown a hopper consisting of the sloping side walls 10, rear wall 11 and front wall 12. In the rear wall 11 is formed an outlet opening 13 which communicates with the fuel feed duct 14 which contains the feed screw 15. The side 11 has its lower portion 16 sloping forwardly to form an angular edge 17.

The shaft 18 of the feed screw 15 passes through the front wall 12 and journals in the bearing 19. The shaft 18 is provided with a sprocket wheel 20 and rotative movement is supplied to the shaft 18 through a reduction gearing contained within the gear case 21 to which power is supplied to the shaft 22 from the motor 23.

Above the conveyor or feed screw 15, and parallel therewith, is mounted a helical agitator 24 which may either be in the form of a round rod or of any other desired shape, one end 25 journaling in the wall 11 of the hopper and the other end 26 journaling in the wall 12 through which it projects, and having on its outer end a sprocket wheel 27 which is driven by the sprocket wheel 20 through the chain 28 which, it will be observed, is outside of the hopper wall 12.

It will be noted that the edge 17 is almost normal to the flight of the agitator 24, the purpose of this being to eliminate as much as possible any tendency to shear the pieces of coal or foreign substances such as rock or tramp metal, which might find its way therein.

While this agitator is illustrated as having its axis parallel to the axis of the feed screw, it is evident that it could also be normal thereto provided it is rotated in a direction which will move the materials away from the wall 11 instead of toward same, as is usually the case.

One of the main difficulties encountered in providing an agitator is the presence of foreign matter in the fuel and when attempts are made to operate the agitator from the feed screw itself this operation is often interfered with, sometimes to the complete destruction of the agitator.

In practice it may be found desirable to provide a casing or guard around the chain 28, although its movements are so slow that in most instances this would be unnecessary.

I claim:

1. In an underfeed stoker, the combination of a hopper having a conveyor screw projecting horizontally into one side of same adapted to draw fuel from said hopper, a spirally wound agitator shaft whose axis of rotation is above and parallel with the axis of said worm, and drive means for said shaft operating continuously with said worm in a manner to oppose its action on the top side thereof.

2. A hopper for underfeed stokers having in combination a fuel feed duct, a magazine communicating with said duct, a screw conveyor in said duct extending into said magazine for moving fuel from said magazine through said duct, and a spirally wound agitator shaft rotatably mounted in said magazine having means for rotating same simultaneously with said conveyor in a manner to break up a congestion of fuel around the junction of said magazine and duct and gradually move the fuel in said magazine which is directly above the conveyor away from its outlet opening.

EDWARD B. BIRKENBEUEL.